United States Patent [19]

Cushing

[11] Patent Number: 4,525,608

[45] Date of Patent: Jun. 25, 1985

[54] TIMER MECHANISM WITH IMPROVED INTERVAL ACCURACY

[75] Inventor: Donald S. Cushing, Louisville, Ky.

[73] Assignee: General Electric Company, Louisville, Ky.

[21] Appl. No.: 446,444

[22] Filed: Dec. 3, 1982

[51] Int. Cl.[3] .................... H01H 43/10; F16H 5/40; F16H 3/74

[52] U.S. Cl. .................... 200/38 R; 200/38 B; 74/2; 74/3.52

[58] Field of Search .................... 74/2, 3.52, 3.54, 567, 74/568 T, 569; 200/38 R, 38 B, 38 BA, 38 C, 38 CA, 39 R, 39 A

[56] References Cited

U.S. PATENT DOCUMENTS

| | | | |
|---|---|---|---|
| Re. 29,158 | 3/1977 | Cartier et al. | 200/38 |
| 2,781,765 | 2/1957 | Steidley | 134/57 |
| 2,782,271 | 2/1957 | Jordan | 200/27 |
| 2,784,582 | 3/1957 | Hartung et al. | 68/12 |
| 3,072,129 | 1/1963 | Seal | 134/57 |
| 3,124,145 | 3/1964 | Egle | 134/57 |
| 3,124,146 | 3/1964 | Jenkins et al. | 134/57 |
| 3,199,525 | 8/1965 | Jellies | 137/107 |
| 3,603,749 | 9/1971 | Davis | 200/38 |
| 3,723,676 | 3/1973 | Harris | 200/39 |
| 3,814,874 | 6/1974 | Brown | 200/38 |
| 3,818,157 | 6/1974 | Voland et al. | 200/38 |
| 3,922,924 | 12/1975 | Harris | 74/3.5 |
| 3,937,981 | 2/1976 | Nystuen et al. | 307/141 |
| 3,965,312 | 6/1976 | Mahon | 200/39 |
| 4,060,702 | 11/1977 | Linn | 200/38 R |
| 4,080,583 | 3/1978 | Fujita | 200/38 R X |
| 4,355,217 | 10/1982 | Cushing | 200/38 B X |
| 4,381,432 | 4/1983 | Cushing | 200/38 B |
| 4,413,164 | 11/1983 | Obermann et al. | 200/38 R |
| 4,453,426 | 6/1984 | Groutage et al. | 74/2 |
| 4,468,600 | 8/1984 | Barthel et al. | 200/38 B X |

*Primary Examiner*—Allan D. Herrmann
*Assistant Examiner*—Stephen B. Andrews
*Attorney, Agent, or Firm*—Frederick P. Weidner; Radford M. Reams

[57] ABSTRACT

A timer comprising a driven control cam having a first and second cam track. First and second resilient arms carry opposing contacts and the second arm has a lateral projection in the direction of the second cam track. A cam following member extending between the second arm and first cam track is biased into cam-following engagement with the first cam track by the second arm. A spring biased pivotal rocker arm having at one end a cam follower portion and at the other end a lifter portion. During rotation of the control cam, the cam following member and first cam track are operative to prevent closing the contacts. The cam following member and firt cam track further being operative to release the cam following member from the first cam track and close the contact. The rocker arm and second cam track being operative to pivot the rocker arm so the lifter portion engages the lateral projection of the second arm and opens the contacts. In addition, there is a mechanism to reset the time for subsequent cycling as mentioned above.

7 Claims, 8 Drawing Figures

TIMER MECHANISM WITH IMPROVED INTERVAL ACCURACY

BACKGROUND OF THE INVENTION

Modern automatic washing appliances such as dishwashers and clothes washing machines commonly employ electromechanical timers for controlling various cyclical appliance operations. Typically, timing accuracy is subject to relatively high tolerance variations. For appliances employing time-controlled fill cycles, high tolerance variations can result in excess water usage beyond that required for satisfactory washing performance. For example, on a 78 minutes per revolution timer cam such as typically employed in a dishwasher, the fill time interval may have up to a plus or minus 8 seconds fill time variation because of the many interacting tolerances in the timer. Nominal dishwasher appliance fill flow rates are on the order of 1.75 gallons/minute. At such rates, a time variation of plus or minus 8 seconds results in a variation of plus or minus roughly 2 pints of water during each fill cycle. For a dishwasher having 6 fill cycles for each load of dishes, the variation in total water usage per load is on the order of plus or minus roughly 1.5 gallons.

One technique known in the art for improving the accuracy of such timers is to employ a drop-to-start, drop-to-stop arrangement. In such an arrangement each resilient contact arm carries a cam follower biased against the control cam track. The control switch is made when the first cam follower drops and opens when the second cam follower drops. Such an approach eliminates the rise portion of the track profile and the gap between contact arms and the relative positioning of cam and switch block as sources of tolerance variations. However, even with this double drop approach, positioning of each cam follower on its corresponding contact arm and the relative positioning of the contact arms themselves remain as significant sources of tolerance variations.

In order to reduce water usage in washing appliances such as dishwashers, an electrical mechanical timer of relatively simple construction which provides improved accuracy capability, particularly for short intervals, is needed.

By this invention there is provided an improved electromechanical timer for washing appliances which improves the timing accuracy for short intervals.

SUMMARY OF THE INVENTION

The invention provides an electromechanical timer with improved means for controlling relatively short intervals, such as fill time intervals for washing appliances, with greater accuracy than conventional electromechanical timers. In accordance with one aspect of the invention, the timer includes a mechanism comprising a control cam having a first and second cam track with the second cam track having three arcuate segments of progressively shorter fixed radius lengths defining a three step cam track profile. Drive means are provided for rotating the control cam about an axis and switch means comprising first and second resilient arms carry opposing contacts and extend generally adjacent the first cam track and the first arm extending between the second arm and the first cam track and the second arm having a lateral projection in the direction of the second cam track. The cam following member extending between the second arm and first cam track is biased into a cam-following engagement with the first cam track by the second arm.

A rocker arm having at one end a cam follower portion and at the other end a lifter portion has a pivot point between the ends thereof and is spring biased to force the cam follower portion into cam-following engagement with the second cam track. During rotation of the control cam, the cam following member and first cam track are operative to prevent closing the contacts when the rocker arm cam-follower portion is riding on the arcuate segment having the longest radius length. The cam following member and first cam track are also operative to release the cam following member from the first cam track and support the first arm on the rocker arm cam follower portion and prevent closing the contacts when the rocker arm cam follower portion is riding on the arcuate segment having the longest radius length. The cam following member and first cam track further being operative to release the cam following member from the first cam track and close the contact when the rocker arm cam follower portion is riding on the arcuate segment having the second longest radius length. The rocker arm and second cam track being operative to pivot the rocker arm when the cam follower portion is riding on the arcuate segment having the shortest radius length and the lifter portion engages the lateral projection of the second arm and opens the contacts. In addition, there is means to reset the timer for subsequent cycling as mentioned above. By this arrangement instantaneous and precise making and breaking of the contacts respectively is achieved to provide timer interval accuracy.

DETAILED DESCRIPTION

Figure 1:
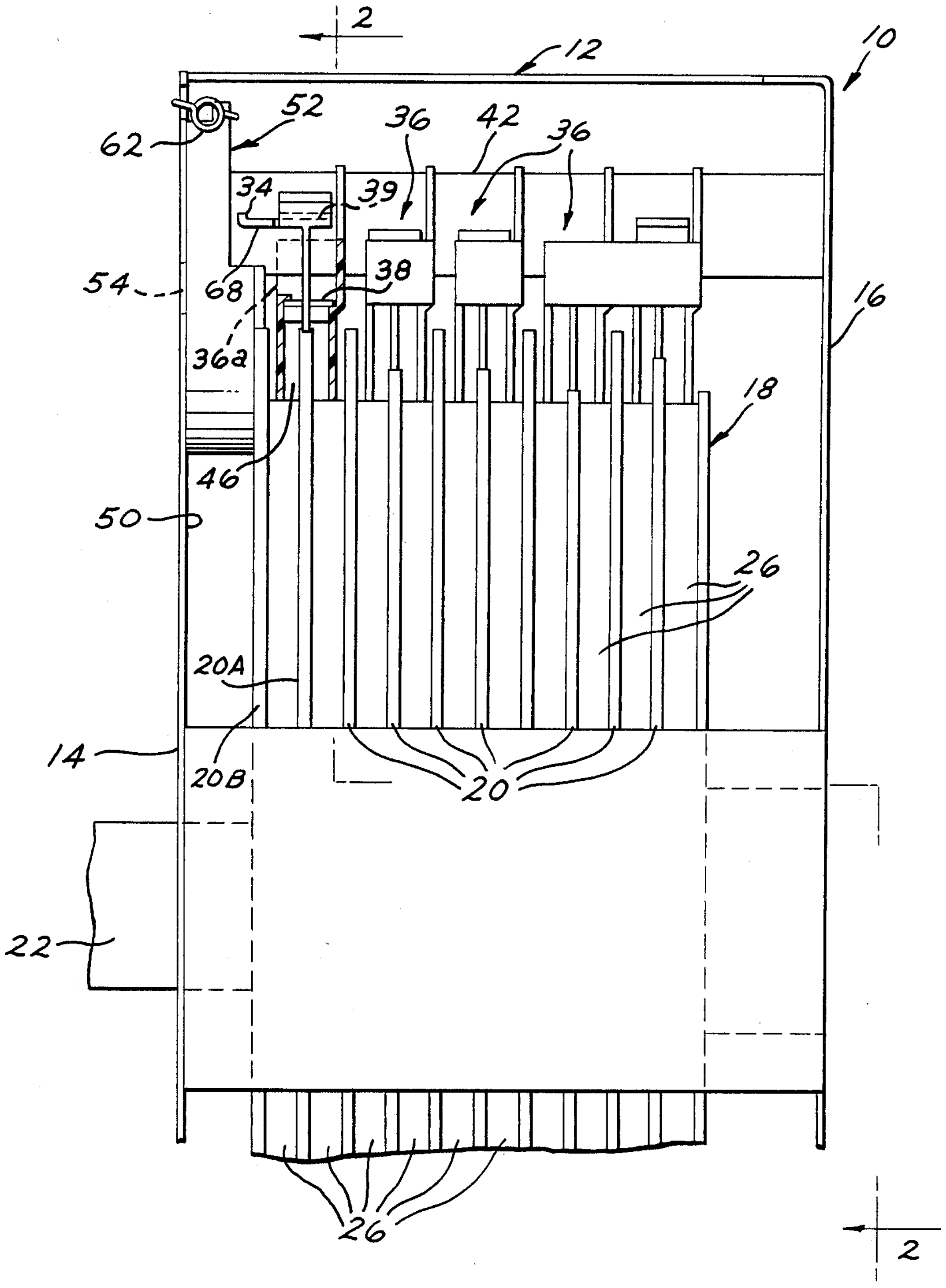
FIG. 1 is side elevational view of an electromechanical timer embodying the present invention with portions cut away to show the internal structure of the timer.
Figure 2:
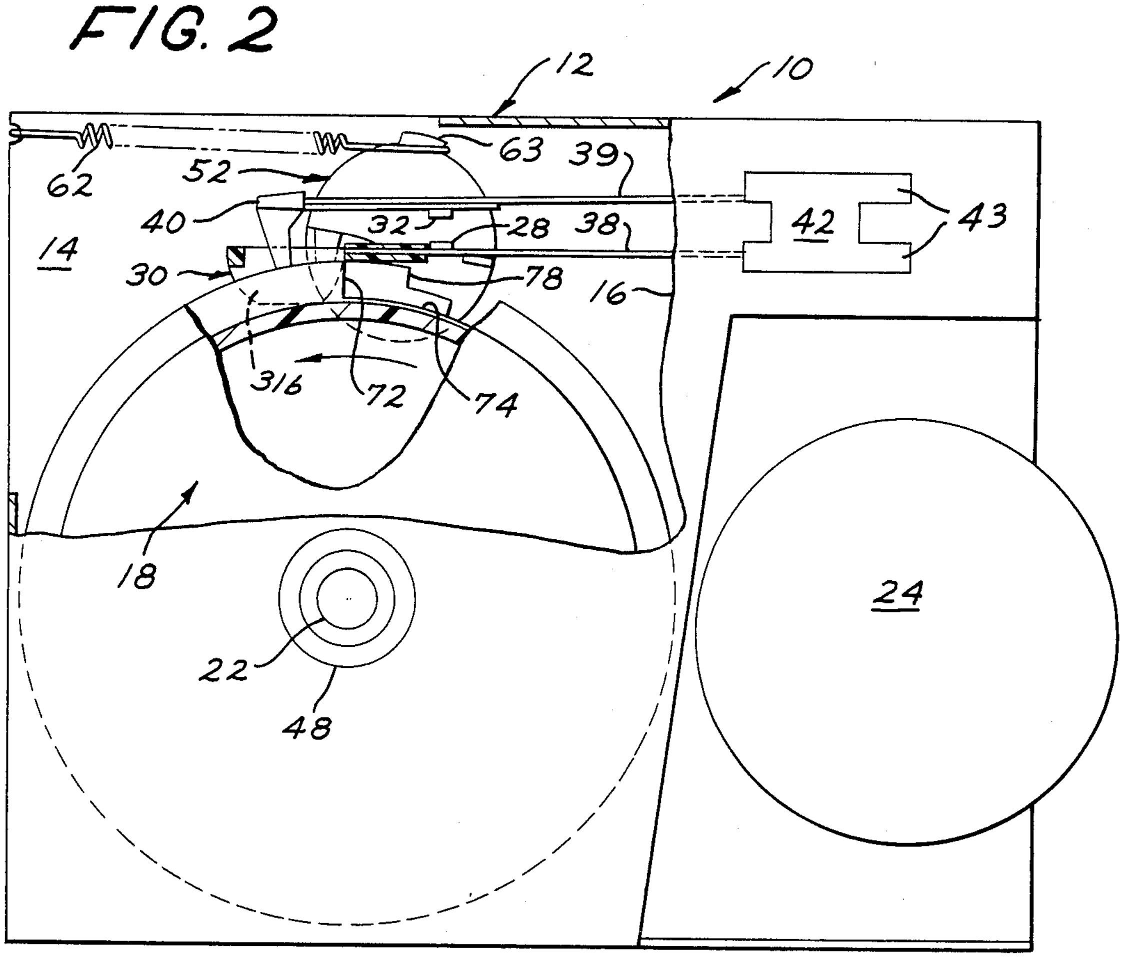
FIG. 2 is a front view taken along lines 2—2 of FIG. 1.
Figure 3:
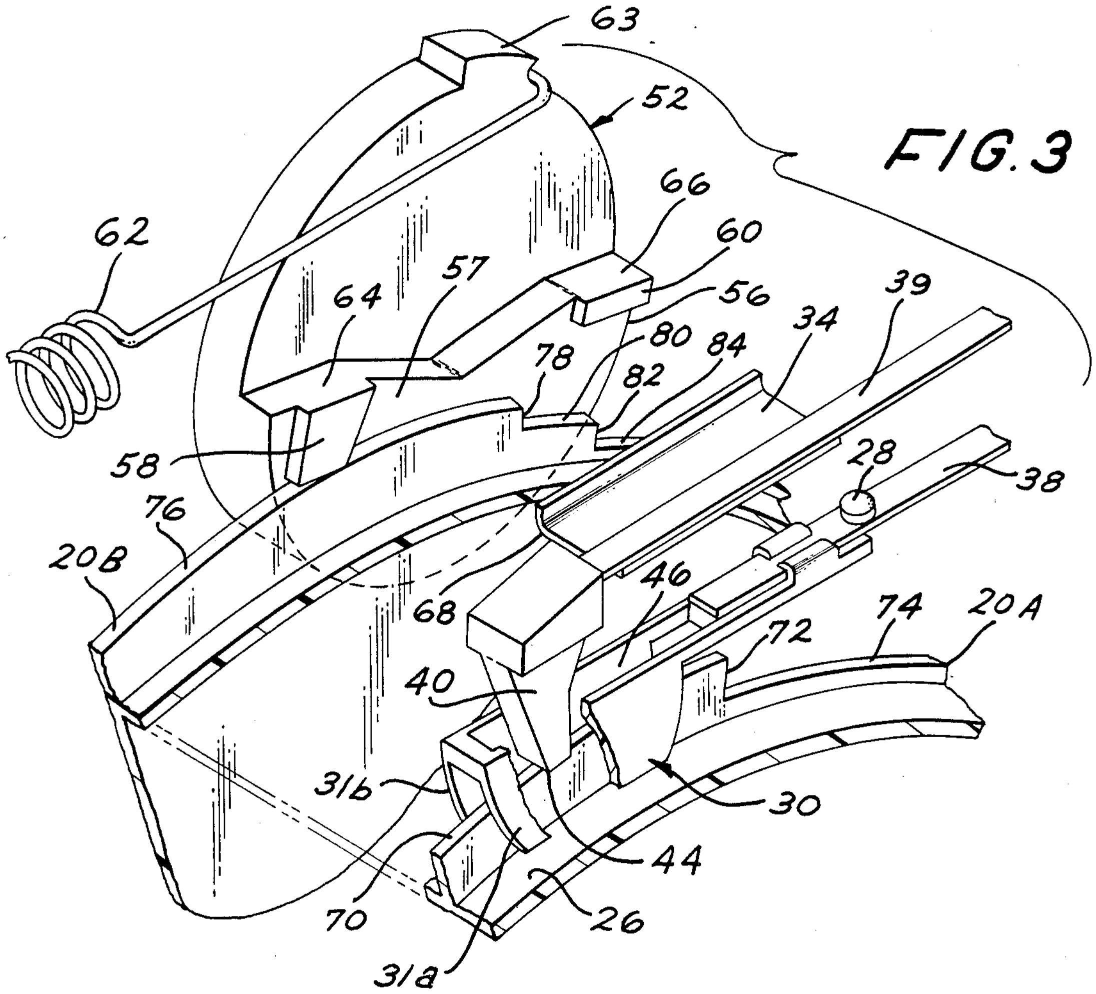
FIG. 3 is a perspective view of a portion of the electromechanical timer of the present invention.

Referring now to FIGS. 1, 2 and 3, the present invention is illustratively embodied by electromechanical timer 10. Structural support for timer 10 is primarily provided by frame 12 including a front plate 14 and a rear plate 16. A control cam 18, having a plurality of circumferential edge control cam surfaces or tracks 20 on its periphery, is formed integrally with a control cam-carrying shaft 22 which is rotatably mounted to frame 12. Control cam 18 is rotatably driven by driving means comprising a conventional timer motor 24 coupled to control cam 18 by a chain of gears (not shown) in a conventional manner well known in the art. A plurality of cam-actuated control switches designated generally 36 are suitably secured to frame 12 by a terminal block 42. Each one of switches 36 comprises a pair of contact arms, each comprising a first arm 38 and a second arm 39 which are disposed in generally tangential relationship to the cylindrical control cam 18. The contact arms extend from a terminal block 42 for actuation by control cam 18. Corresponding contacts 43 project from the opposite side of block 42 for electrically connecting the switches to external circuitry. Each contact arm carries a cam follower arranged for cam-following engagement with control cam tracks 20. Control cam tracks 20 are contoured to provide the desired sequential switch actuation. A timer control knob 48 is suitably mounted to that portion of shaft 22 extending outwardly through front plate 14 to permit user manipulation of the timer.

The timer structure and operation described thus far is typical of electromechanical timers well known in the art. Such timers are subject to fairly high tolerance variations in controlling time intervals. For example, for a 78 minute per revolution timer cam, such as is representative of timers used for domestic washing appliances, a 60 second fill time interval may have a plus or minus 8 second variation.

While such tolerances do not adversely affect satisfactory washing performance, it does adversely impact upon water usage. In order to minimize water usage, thereby reducing the amount of energy consumed in heating such water, it is desirable to provide an accurate means for controlling fill time intervals. This invention is directed to an improved cam-actuated switch arrangement which provides significantly improved accuracy for the relatively short time intervals associated with typical appliance fill cycles, but yet is of relatively simple and inexpensive construction.

The improved cam actuated switch arrangement involves utilizing two of the cam tracks 20, designated 20*a* and 20*b*, which are adjacent to each other and located near the front plate 14 at the extreme end of the control cam. Cam tracks 20*a* and 20*b* are spaced parallel to each other and rise or project upwardly from the cylindrical base portion 26 of the control cam 18. The switch assembly 36*a* has a first resilient arm 38 with a contact 28 on its upper surface and a bifurcated cam follower portion 30 at the front end which rides on the upper surface of the cyclindrical base portion 26 of the control cam 18. The legs 31*a* and 31*b* of the bifurcated cam follower portion 30 straddle cam track 20*a* to confine the cam follower portion 30 against lateral movement whereby the cam-follower is kept on its associated cam. First arm 38 is resilient and is arranged to bias or urge the bifurcated cam follower portion 30 downwardly in contact with the cylindrical base portion 26.

The switch assembly 36*a* also has located immediately above the first arm 38 a second arm 39 which is biased downwardly in the direction of the first arm 38. The second arm 39 has a lateral projection member 34 that extends in the direction of the cam track 20*b*. The underneath surface of lateral member 34 has a contact 32 which is in alignment with and opposes contact 28 of first arm 38. Forward of the lateral projection member 34 is a cam following member 40 which has its lower end 44 in contact with the first cam track 20*a*. It will be noted from FIG. 3 that the cam following member 40 is arranged to pass through an opening 46 of the bifurcated cam follower portion 30 so that it may be urged against and in contact with the first cam track 20*a*. Thus far this cam following arrangement is conventional with the exception of the lateral projection member 34, however, the structural arrangement and functional operation of how the contacts 28 and 32 of the respective first arm 38 and second arm 39 are made to contact and break contact to achieve the desired switching control will now be discussed.

Adjacent the inside surface 50 of the front plate 14 is a rocker arm 52 mounted on the front plate 14 as by a pivot 54 so that the rocker arm may be rotated back and forth about the pivot. The rocker arm, as shown in the drawings, may be circular in shape and has at its front face 56 a projecting portion 57 having at one end a projecting cam follower portion 58 and at the other end a projecting lifter portion 60 such that the rocker arm 52 has its pivot point between the ends thereof. The rocker arm is spring biased as by means of a coil tension spring 62 one end of which is secured to a lug 63 on the periphery of the rocker arm and the other end to a stationary member such as the timer frame 12 so as to force the cam follower portion 58 into cam following engagement with the second cam track 20*b*. The cam follower portion 58 and lifter portion 60 on the rocker arm 52 underlie the lateral projection member 34 of the second arm 39 of the switch 36*a* as most clearly seen in FIG. 1. With this arrangement then with sufficient rotation of the rocker arm 52 about its pivot 54 in one direction or the other either the top surface 64 of the cam follower portion 58 or the top surface 66 of the lifter portion 60 will abut against the bottom surface 68 of the lateral projection 34 secured to switch arm 39.

Cam track 20*a* has an upper track segment 70 against which the lower end 44 of cam following member 40 rides and then a drop 72 with a lower track segment 74. Thus in the control cam 18 for the first cam track 20*a* the upper track segment 70 has the longest radius length compared to the lower track segment 74. The rest of the cam track can have whatever configuration is necessary for the operation of the timer in the appliance as desired. The second cam track 20*b* has an upper track segment 76, a drop 78, a middle track segment 80, a drop 82, and a lower track segment 84. In the control cam 18 for the second cam track 20*b* the upper track segment 76 would have the longest radius length, the middle track segment 80 would have the second longest radius length and the lower track segment 84 would have the shortest radius length.

Figure 4:
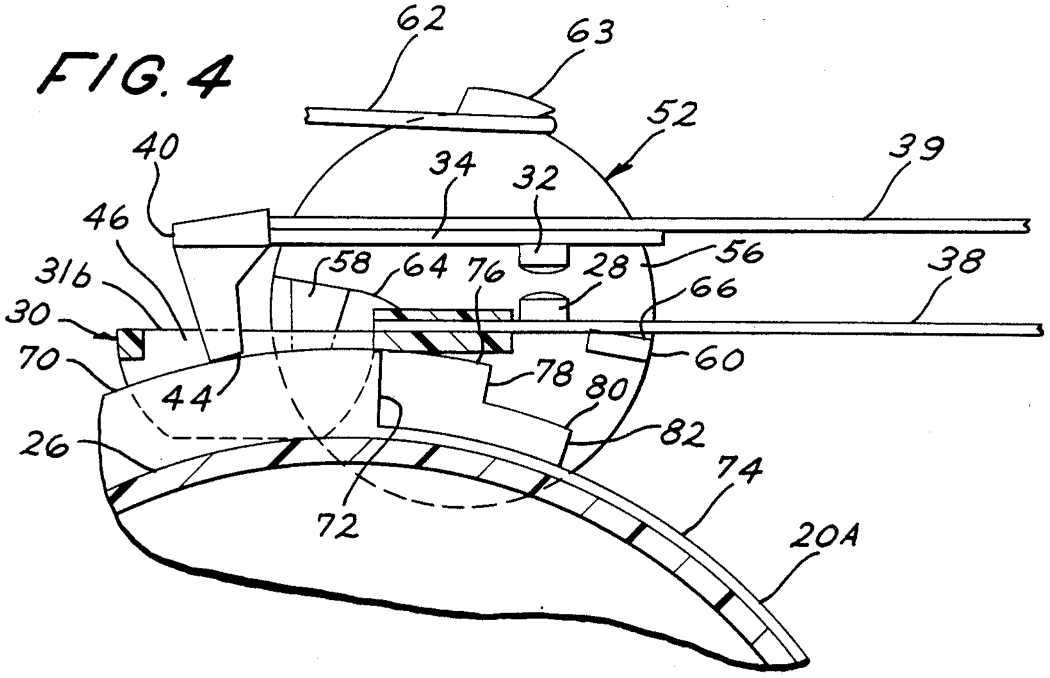
FIG. 4 is a partial view of the timer of FIG. 2 enlarged to show the first stage of the timer mechanism operation.

With reference to FIGS. 4–8 the sequential operation of the above-described timer will now be discussed. FIG. 4 shows the switch 36*a* arrangement in the first stage wherein the cam following member 40 of the second arm 39 is riding on upper track segment 70 of the first cam track 20*a*. At that time, the cam follower portion 58 of the rocker arm 52 is riding on the upper segment 76 of the cam track 20*b* and the contacts 28 and 32 are out of contact with each other as the first and second arms are essentially parallel to each other. In this stage the cam following member 40 and first cam track 20*a* are operative to prevent closing the contacts when the rocker arm follower portion 58 is riding on the arcuate segment 76 having the longest radius length of cam track 20*b*.

Figure 5:
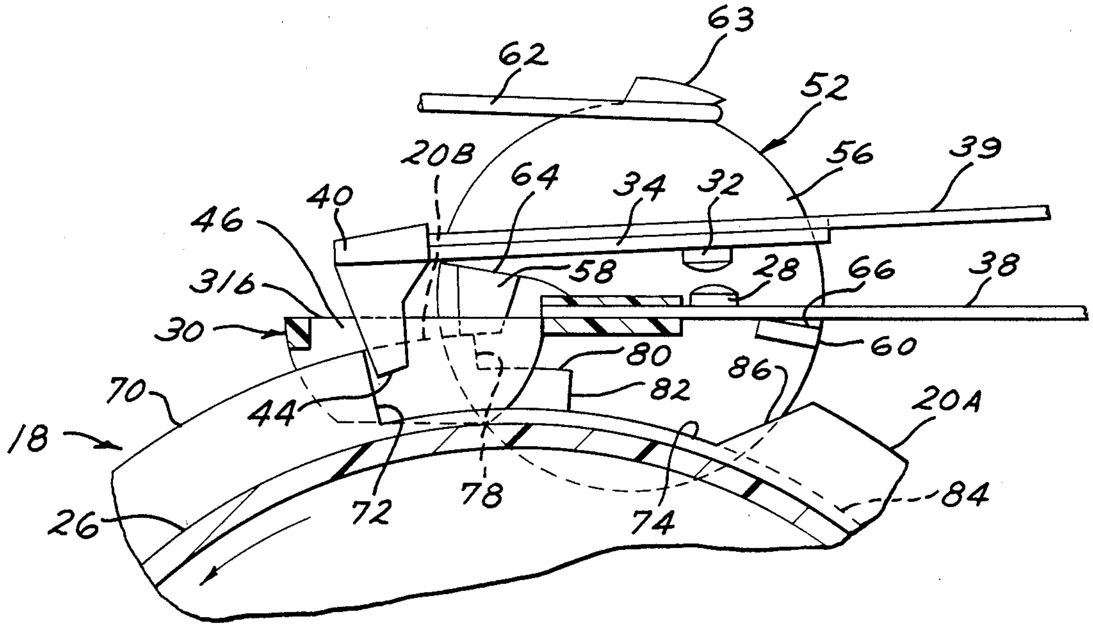
FIG. 5 is a partial view of the timer of FIG. 2 enlarged to show the second stage of the timer mechanism operation.

With reference to FIG. 5 when the control cam 18 has been rotated in the direction of the arrow shown in the figure, the cam following member 40 of the second arm 39 drops off the upper track segment 70 and in doing so the lateral projection member 34 strikes the top surface 64 of the rocker arm 52 and is retained thereon due to the spring bias force of the second arm 39 in the downward direction. It will be noted that the cam following member 40 is held up out of engagement with the lower track segment 74 of the first cam track 20*a*. As can be seen in FIG. 5, the contacts 28 and 32 are not in contact with each other at this stage. With this arrangement then the cam following member 40 and first cam track 20*a* are operative to release the cam following member from the first cam track segment 70 and support the first arm 38 on the rocker arm and prevent closing the contacts 28 and 32 when the rocker arm cam follower portion 58 is riding on the arcuate segment 76 having the longest radius length.

Figure 6:
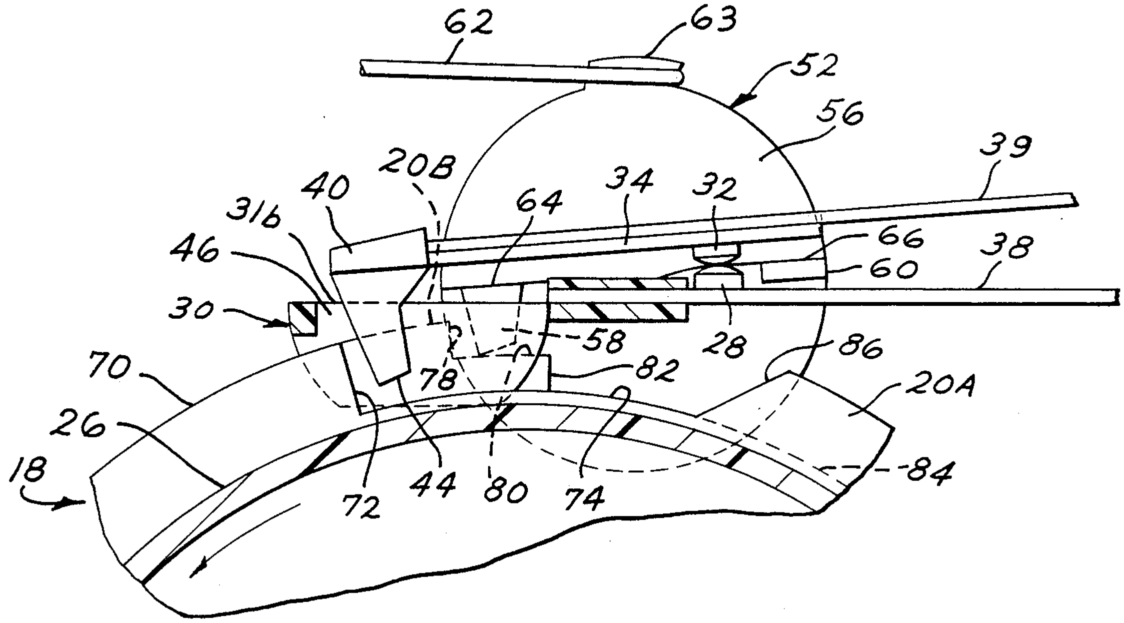
FIG. 6 is a partial view of the timer of FIG. 2 enlarged to show the third stage of the timer mechanism operation.

With reference to FIG. 6 the continued rotational movement of the control cam 18 in the direction of the arrow progresses the first and second cam tracks 20*a* and 20*b* respectively so that the cam follower portion 58 of the rocker arm 52 drops off the drop 78 in cam track 20*b* and comes into contact with the middle segment 80. The continued bias force of the second arm 39 lowers the arm toward the first arm 38 and allows the contacts 28 and 32 to immediately close. In this position it will be noted that the cam following member 40 of the second arm 39 is still out of contact with the lower track segment 74 of the first cam track 20*a*. In this stage the cam following member 40 and first cam track 20*a* are operative to release the cam following member from the first cam track and close the contacts with the rocker arm cam follower portion riding on the arcuate middle track segment 80 having the second longest radius length.

Figure 7:
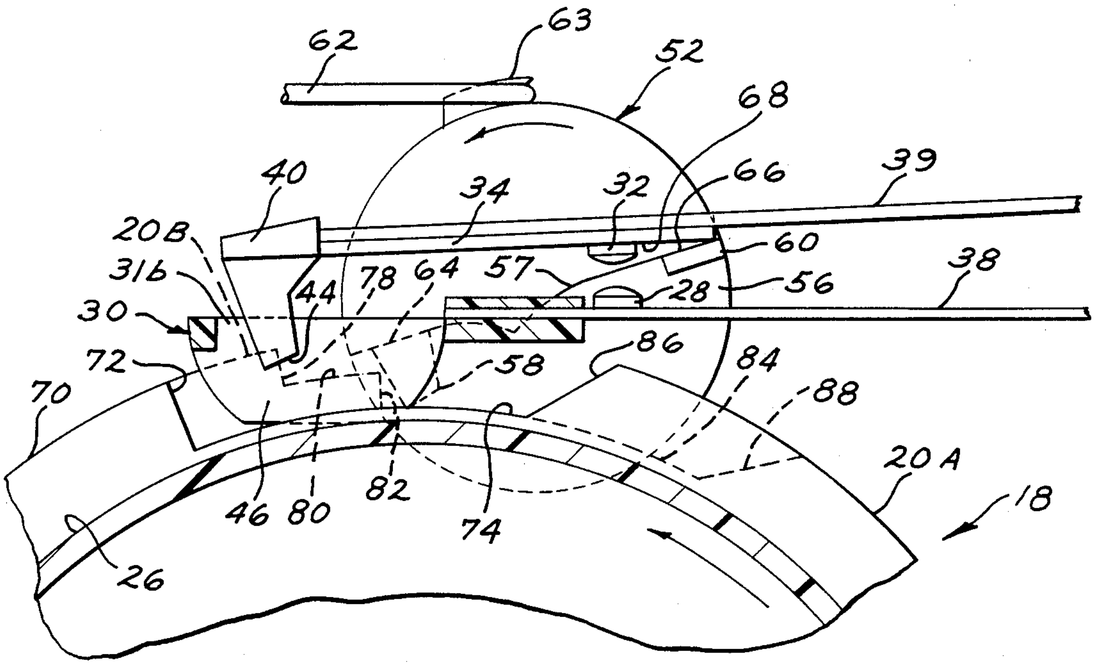
FIG. 7 is a partial view of the timer of FIG. 2 enlarged to show the fourth stage of the timer mechanism operation.

With reference to FIG. 7 the continued rotation of the control cam 18 in the direction of the arrow causes the cam follower portion 58 of the rocker arm 52 to fall off the second drop 82 and ride on the lower track segment 84 and in doing so the coil tension spring 62 rotates the rocker arm 52 about its pivot 54 in a counterclockwise direction as viewed in FIG. 7 as shown by the arrow at the top of the rocker arm. This rotational movement of the rocker arm 52 causes the upper surface 66 of the lifter portion 60 to engage the bottom surface 68 of the lateral projection member 34 extending from the second arm 39 and overlying the lifter portion 60 and by sufficient spring force raises the second arm 39 upwardly so that the contacts 28 and 32 are separated and out of contact with each other. By this arrangement the rocker arm 52 and second cam track 20*b* are operative to pivot the rocker arm when the cam follower portion is riding on the arcuate lower track segment 84 having the shortest radius length and the lifter portion 60 engages the lateral projection member 34 of the second arm 39 and opens the contacts. Thus far the contacts have been closed and opened and at this stage the timer needs to be reset for subsequent cycling as described above.

Figure 8:
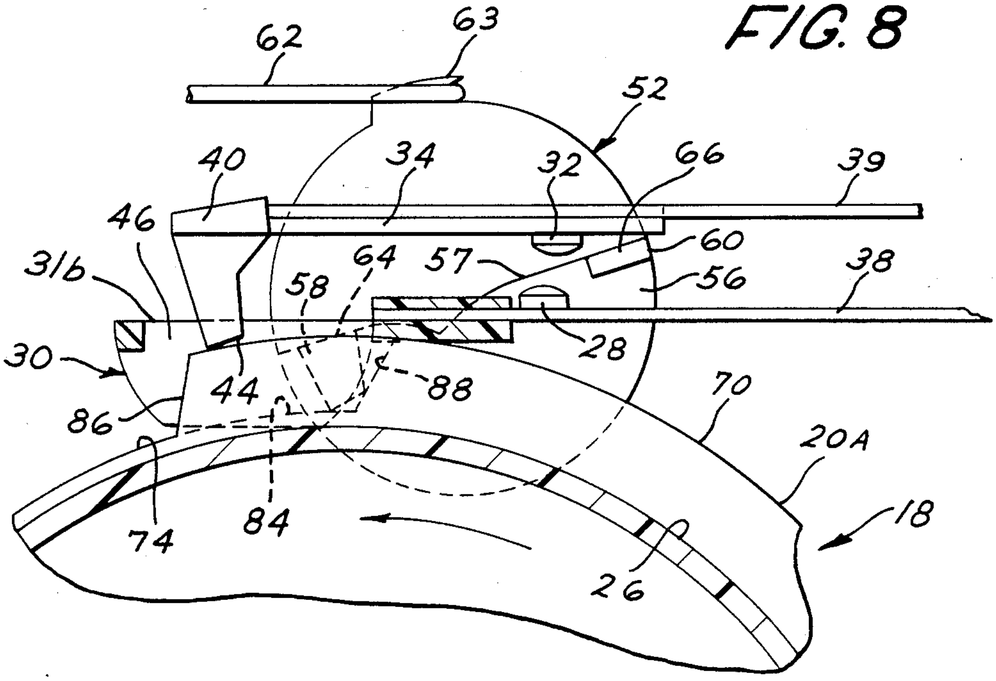
FIG. 8 is a partial view of the timer of FIG. 2 enlarged to show the fifth stage of the timer mechanism operation.

With reference to FIG. 8 the first stage in resetting the timer is to provide for an upwardly directed ramp 86 in the first cam track 20*a* so that rotational movement of the control cam 18 in the direction of the arrow will cause the cam following member 40 of the second arm 39 to ride up the inclined ramp 86 and ride on the upper segment 70 of the first cam track 20*a*. Resetting of the timer continues with rotation of the control cam 18 by having the cam follower portion 58 of the rocker arm 52 engage an upwardly directed ramp 88 provided on the second cam track 20*b* so that the cam follower portion 58 is caused to ride up the ramp 88 and in doing so overcomes the spring tension provided by the coil tension spring 62 and rotates the rocker arm 52 in a clockwise direction as shown in FIG. 8 and the cam follower portion 58 will be riding on the upper track segment 76 thus restoring the timer to the position shown in FIG. 4 to complete the resetting of the timer.

By the foregoing timer arrangement and operation it will be understood that the actuation of the switch by the contacts 28 and 32 being quickly engaged and quickly disengaged allows for very precise timing of the cycle because the contacts make contact by an instantaneous drop of the cam follower and the contacts are disengaged also by an instantaneous drop of the cam follower member of the rocker arm.

While specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A timer comprising:

a control cam having a first and second cam track;

said second cam track having three arcuate segments of progressively shorter fixed radius lengths defining a three step cam track profile;

drive means for rotating the control cam about an axis;

switch means comprising first and second resilient arms carrying opposing contacts and extending generally adjacent said first cam track, said first arm extending between said second arm and said first cam track and said second arm having a lateral projection member in the direction of the second cam track;

a cam-following member extending between said second arm and said first cam track and biased into cam-following engagement with said first cam track by said second arm;

a rocker arm having at one end a cam-follower portion and at the other end a lifter portion, said rocker arm having a pivot point between the ends thereof and spring biased to force the cam-follower portion into cam-following engagement with the second cam track;

said cam-following member and first cam track being operative to prevent closing the contacts when said rocker arm cam-follower portion is riding on the arcuate segment having the longest radius length;

said cam-following member and first cam track being operative to release the cam-following member from the first cam track and support the first arm on the rocker arm and prevent closing the contacts when said rocker arm cam-follower portion is riding on the arcuate segment having the longest radius length;

said cam-following member and first cam track being operative to release the cam-following member from the first cam track and close the contacts when said rocker arm cam-follower portion is riding on the arcuate segment having the second longest radius length;

said rocker arm and second cam track being operative to pivot the rocker arm when the cam follower portion is riding on the arcuate segment having the shortest radius length and the lifter portion engages the lateral projection member of the second arm and opens the contacts; and means to reset the timer for subsequent cycling.

2. The timer of claim 1 in which the control cam is cylindrical with the cam tracks axially spaced along the cylinder and the resilient arms of the switch means are disposed in generally tangential relationship to the cylindrical control cam.

3. The timer of claim 1 in which the pivotal rocker arm is circular and is spring-biased by a coil tension spring, one end of which is secured to the periphery of the rocker arm and the other end to a stationary member.

4. The timer of claim 1 wherein the first and second cam tracks are adjacent each other and located at one extreme end of the control cam.

5. The timer of claim 1 wherein the lateral projection member on the second arm carries the contact for that arm.

6. The timer of claim 1 including a frame that has a front plate to which the rocker arm is pivotally attached.

7. The timer of claim 1 in which the first arm has a bifurcated cam follower portion with an opening and legs that straddle the first cam track and the cam-following member of the second arm extends through the opening of the bifurcated cam follower portion of the first arm and engages the first cam track.

* * * * *